US011294906B2

(12) United States Patent
Patel et al.

(10) Patent No.: US 11,294,906 B2
(45) Date of Patent: Apr. 5, 2022

(54) DATABASE RECORD SEARCHING WITH MULTI-TIER QUERIES

(71) Applicant: SAP SE, Walldorf (DE)

(72) Inventors: Ashutosh Patel, Bangalore (IN); Panish Ramakrishna, Bangalore (IN); Nithya Rajagopalan, Bangalore (IN)

(73) Assignee: SAP SE, Walldorf (DE)

( * ) Notice: Subject to any disclaimer, the term of this patent is extended or adjusted under 35 U.S.C. 154(b) by 183 days.

(21) Appl. No.: 16/432,196

(22) Filed: Jun. 5, 2019

(65) Prior Publication Data
US 2020/0387513 A1    Dec. 10, 2020

(51) Int. Cl.
| | | |
|---|---|---|
| *G06F 16/245* | (2019.01) | |
| *G06F 16/2455* | (2019.01) | |
| *G06F 16/22* | (2019.01) | |
| *G06F 16/901* | (2019.01) | |
| *G06F 16/903* | (2019.01) | |
| *G06F 16/2457* | (2019.01) | |

(52) U.S. Cl.
CPC .... *G06F 16/24564* (2019.01); *G06F 16/2282* (2019.01); *G06F 16/24578* (2019.01); *G06F 16/9017* (2019.01); *G06F 16/90344* (2019.01)

(58) Field of Classification Search
CPC .......... G06F 16/24564; G06F 16/2282; G06F 16/9017; G06F 16/90344; G06F 16/24578

USPC ................... 707/713, 722, 759, 765
See application file for complete search history.

(56) References Cited

U.S. PATENT DOCUMENTS

| | | | | |
|---|---|---|---|---|
| 8,903,817 B1* | 12/2014 | Duggar | ................ | G06F 16/337 |
| | | | | 707/728 |
| 2005/0222975 A1* | 10/2005 | Nayak | ................... | G06F 16/338 |
| 2009/0187548 A1* | 7/2009 | Ji | ........................ | G06F 16/9577 |
| 2015/0026153 A1* | 1/2015 | Gupta | ..................... | G06N 5/04 |
| | | | | 707/711 |
| 2016/0092508 A1* | 3/2016 | Ivchenko | .............. | G06F 16/338 |
| | | | | 707/713 |
| 2016/0103920 A1* | 4/2016 | Lee | ..................... | G06F 16/2453 |
| | | | | 707/706 |
| 2017/0262449 A1* | 9/2017 | Venkataraman | .... | G06F 16/3325 |

* cited by examiner

*Primary Examiner* — Hares Jami
(74) *Attorney, Agent, or Firm* — Schwegman Lundberg & Woessner, P.A.

(57) ABSTRACT

Various examples are directed to systems and methods for identifying database records in a database table. A database management system receives a search request comprising a first set of strings associated with a first column of the database table and a second set of strings associated with a second column of the database table. The database management system selects a set of first column keywords using the first set of strings and executes a first tier query at the database table. Responsive to determining that no database record returned by the first tier query has a relevance score greater than a threshold value, the database management system executes a second tier query at the database table.

19 Claims, 10 Drawing Sheets

US 11,294,906 B2

DATABASE RECORD SEARCHING WITH MULTI-TIER QUERIES

TECHNICAL FIELD

This document generally relates to methods and systems for use with computer networks. More particularly, this document relates to searching records at a database table.

BACKGROUND

Databases are used in many different computer processing environments to store data, often in a structured and easily-accessible way. Many databases are managed by database management systems that execute database operations received from users. In some examples, a database management system identifies a database record or records matching a user search request desires to identify a particular record from a database table.

BRIEF DESCRIPTION OF DRAWINGS

The present disclosure is illustrated by way of example and not limitation in the following figures.

DETAILED DESCRIPTION

Figure 1:
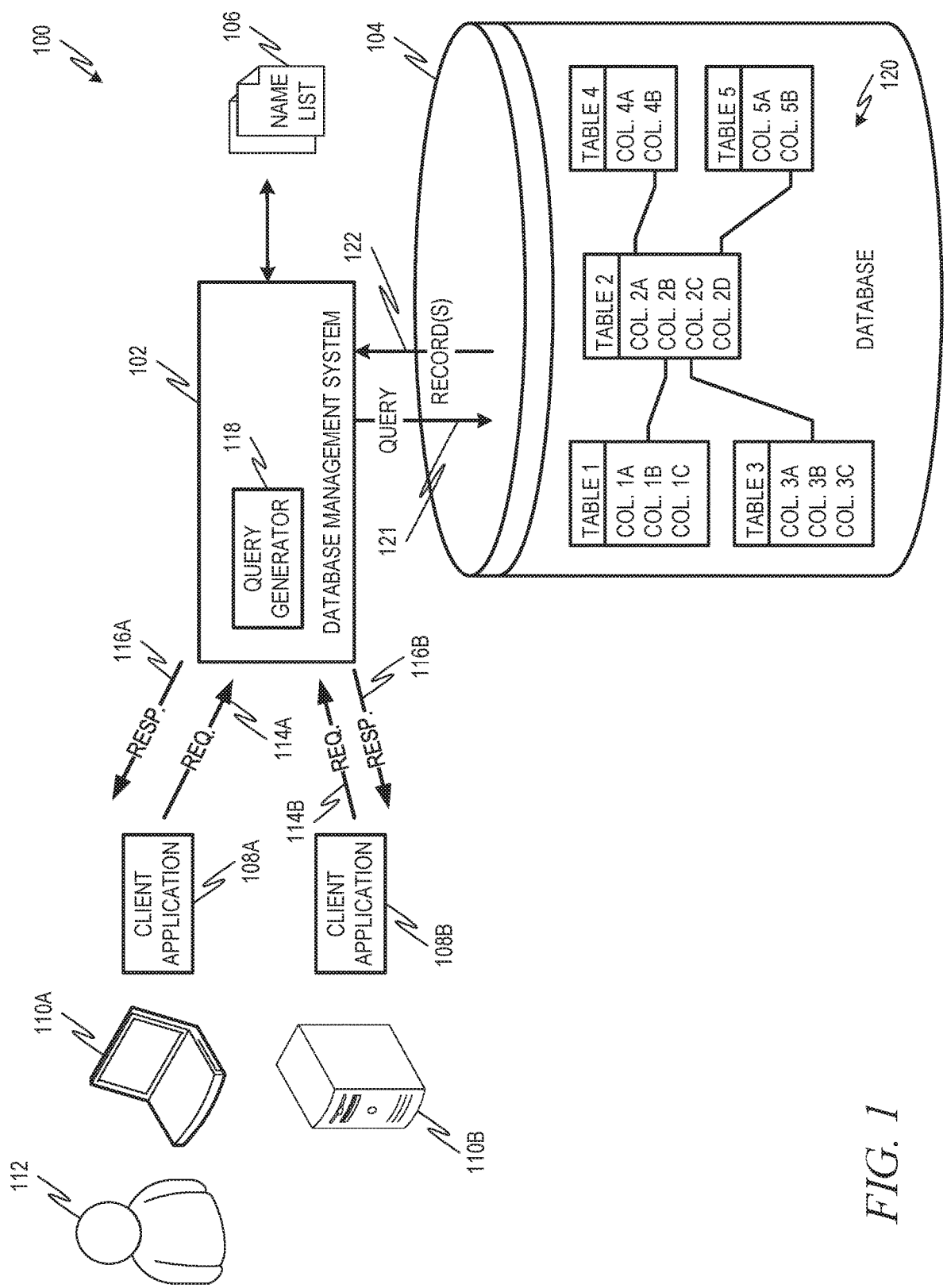
FIG. 1 is a diagram showing one example of an environment for implementing database record searching.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

There are many database tasks that involve selecting a database record or records that meet search request parameters provided by a user. For example, a user may want to view data from a record, update a record, identify records relevant to a business task that the user is performing, etc. Consider an example database table including records that correspond to business entities, such as suppliers, customers, etc. Each record has multiple fields describing a business entity such as, for example, one or more names of the entities, address information about the entity (e.g., street address, city, country, postal code, etc.), description of a relationship to the business entity (customer, supplier, etc.). The user may desire to identify a record or records for various reasons. For example, the user may want to identify a particular customer or supplier and/or a set of customers or suppliers meeting various criteria for various reasons including, for example, to update the database table, to select a customer or supplier for a particular business task, etc.

Consider another example database table including records that correspond to employees of a business entity. Record fields can include the employees first name, last name, home address information, salary, etc. A user may desire to select a record or records, for example, to access information about an employee, update an employee record, etc.

A database management system can respond to a search request from a user by directly applying a query to a database table. A direct query identifies records in a database table that have user-provided search strings in the relevant columns or record fields. Returning to the business entity example above, the user may provide a search request including search strings for an entity name (e.g., "Acme" "Widgets,") etc., search strings for the entity address (e.g., "Kansas City," "Reed Street."), etc. In a direct query, the database management system returns records that include the indicated search strings.

In practice, however, direct query searches can fail to provide suitable search results. For example, the user may not select search strings that match the database records. This can result from user error or misinformation, from errors at the database tables, or other factors. For example, location information such as the street address of an entity may be incorrectly indicated in the search strings and/or at the database table. Sometimes the search strings and/or the database table may include a mismatch between fields, such as a postal code field and a city field.

For these and other reasons, direct queries often fail to provide the best set of search result records. Sometimes, direct queries can lead to a sub-optimal match and/or non-match, even when a responsive record or records exist in the database table. If the set of returned records is not relevant and/or if the best responsive record is not returned, further ranking and/or scoring of the results will not be effective. In some cases, this can cause a user to manually search the database table, which can affect timeliness as well as quality.

These and other problems are address utilizing a record search technique described herein using techniques such as keyword identification and multi-tiered searching. According to keyword identification, the database management system uses search strings to select query keywords. The selected keywords are then used to query the database to identify one or more records from the records table. According to multi-tiered searching, more than one tier or round of querying is performed. In a first tier query, keywords from different table columns are used to create a first level of restrictiveness. For example, keywords from a first column may be included in a "must" clause while keywords from a second column may be included in a "should" clause.

If the first tier query fails to produce one or more records having a relevance score greater than a threshold level, then a second tier query is generated. The second tier query uses the keywords in a less restrictive manner. For example, one or more keywords included in a must clause for the first tier query can be used in a should clause. Also, in some examples, one or more keywords used in a conjunctive combination in the first tier query may be used in a disjunctive combination in the second tier query. More than two tiers can be used. For example, if the second tier query also fails to return one or more records having at least the threshold level relevance score, a third tier query may be executed, where the third tier query is less restrictive than the second tier query.

FIG. 1 is a diagram showing one example of an environment 100 for implementing database record searching. The environment 100 includes a database management system 102 with a query generator 118. The database management system 102 is in communication with client applications 108A, 108B, which may execute at client computing devices 110A, 110B.

The database management system 102 manages a database 104 organized according to an example database schema 120. A database schema, such as the database schema 120, may describe various tables at a database including the columns of the tables and the relationships between the tables. The example database schema 120 shown in FIG. 1 includes five tables, labeled TABLE 1, TABLE 2, TABLE 3, TABLE 4 and TABLE 5. Each table includes one or more columns. For example, TABLE 1 includes three columns labeled 1A, 1B, 1C. TABLE 2 includes four columns labeled 2A, 2B, 2C, 2D. TABLE 3 includes three columns labeled 3A, 3B, 3C. TABLE 4 includes two columns labeled 4A, 4B. TABLE 5 also includes two columns labeled 5A, 5B.

A table, such as TABLES 1-5 in the example database schema 120, may include one or more records. A record in a table may correspond to a row of the table. The record may include record fields that correspond to the columns of the table. For example, a representation of TABLE 1 of the example database schema 120 is provided below:

TABLE 1

| COL. 1A<br>(Entity Name) | COL. 1B<br>(City) | COL. 1C<br>(Postal Code) |
| --- | --- | --- |
| Acme Fishing Supplies Ltd. | Kansas City | 64157 |
| McGregor Bait and Tackle, Inc. | Richmond | 23173 |
| Smith Rod & Reel LLC | Helena | 59601 |

In the example above, records in TABLE 1 indicate business entities (e.g., customers, suppliers, or other suitable business entities). COL. 1A indicates entity names; COL. 1B indicates a city associated with the entity; and COL. 1C indicates a postal code associated with the entity. Three example records are shown. A first record (Acme Fishing Supplies Ltd., Kansas City, 64157) corresponds to a first row of TABLE 1 and includes three record fields. For example, a record field including the data "Acme Fishing Supplies Ltd." is classified under the column COL. 1A. (It may also be said that the record field including the data "Acme Fishing Supplies Ltd." is in the column COL. 1A.) A record field including the data "Kansas City" is in the column COL. 1B. A record field including the data "64157" is in the column COL. 1C. The records (McGregor Bait and Tackle, Inc, Richmond. 23173) and (Smith Rod & Reel LLC, Helena, 59601) include record fields similarly described by the columns COL. 1A, COL. 1B, and COL. 1C. It will be appreciated that the arrangement of TABLE 1 above is just one example and that other suitable table arrangements may be used, for example, in different contexts.

The database schema 120 is an example provided to illustrate the systems and methods described herein. The database record searching described herein may be implemented in any suitable database schema, including schemas having more or fewer tables, tables with more or fewer columns, tables with more or fewer records, etc.

The client applications 108A, 108B may execute at client computing devices 110A, 110B. Client computing devices 110A, 110B may be or include any suitable computing device or combination of computing devices. For example, client computing devices 110A, 110B may be or include any suitable type of server, laptop computer, desktop computer, tablet computer, mobile computer, etc.

Client applications 108A, 108B may be associated with a user account or user. In some examples, the user is a human user. In FIG. 1, the example client application 108A is operated by a human user 112. In some examples, the user is non-human (e.g., a software or hardware component). For example, the client application 108B may have a user account with the database management system 102 that does not require human intervention to use. Accordingly, client application 108B may be a user. Client applications 108A, 108B make search requests 114A, 114B. A search request 114A, 114B includes sets of strings associated with different columns of a table at the database 104. In some examples, a search request 114A, 114B also includes an indication of a table at the database schema 120 to which the search request 114A, 114B is directed.

A search request 114A, 114B is received at the database management system 102. A query generator 118 at the database management system 102 uses the search request 114A, 114B to generate one or more queries 121 to the database 104. The one or more queries 121 return one or more records 122. Records 122 are returned to the requesting client application 108A, 108B at responses 116A, 116B.

Figure 2:
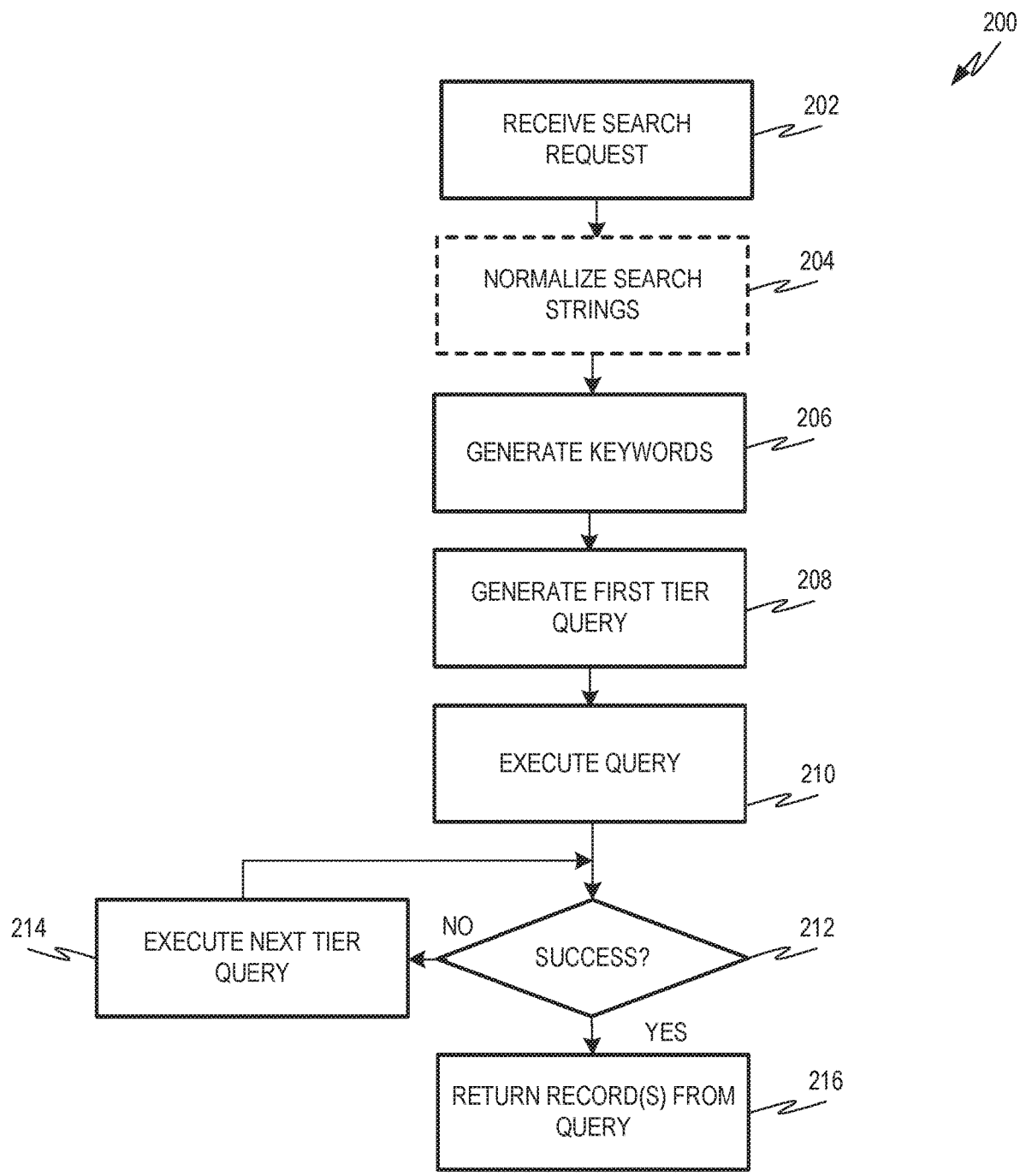
FIG. 2 is a flowchart showing one example of a process flow that is executed by a database management system to identify one or more database records in response to a search request.

FIG. 2 is a flowchart showing one example of a process flow 200 that is executed by the database management system 102 (e.g., the query generator 118 thereof) to identify one or more database records in response to a search request 114A, 114B. At operation 202, the database management system 102 receives a search request 114A, 114B. The search request 114A, 114B includes sets of search strings associated with different columns of a table from the schema. For example, a first set of search strings is associated with a first column and a second set of search strings is associated with a second column. If the table has additional columns, additional sets of search strings may be included in the search request 114A, 114B. In some examples, the search request 114A, 114B includes search string sets for less than all of the columns in the table.

At optional operation 204, the database management system normalizes the sets of search strings. For example, synonyms and stop words may be filtered from the sets of search strings. Synonyms are words that have the same meaning. For example, if the set of search strings for a given column include the word "fishing" and "angling," normalizing the set of search strings may include deleting one instance of the synonym. Stop words are words that are very common in the relevant language. Example stop words in English include "the," "a," "it," etc. Other example normalization that may be performed includes removing noise suffixes, removing trailing numerical characters, removing or replacing abbreviations with full words, removal of company forms (e.g., Ltd., Inc., LLC) from a column indicating the company's name, removal of company locations from a column indicating the company's name, etc.

At operation 206, the database management system 102 generates keywords from some or all of the sets of search strings received with the search requests 114A, 114B. In some examples, sets of keywords are generated for different columns described by the search request 114A, 114B. For example, the database management system 102 may generate a set of first column keywords using a first set of search strings associated with the first column, a set of second column keywords using a second set of search strings associated with the second column, and so on. For a first column, the database management system 102 assigns search strings to relevance categories or buckets. A first relevance category can be based on matches between the set of search strings and a name selected from an approved list 106 that best matches the set of search strings. Additional relevance categories can be based on the frequency with which a search string appears in search requests 114A, 114B. The database management system 102 can use the categorized search strings to select keywords for the relevant column. For example, all search strings included in the a most relevant category may be used as keywords. If fewer than a threshold number of keywords result from the most relevant category, search strings may be selected from less relevant buckets. Additional examples describing keyword selection are described herein, for example, with reference to FIGS. 3 and 4.

At operation 208, the database management system 102 generates a first tier query, such as query 120. The first tier query uses the keywords generated at operation 206 to query the relevant table at the database 104. The first tier query can be at a first level of restrictiveness and returns one or more records 122. The first tier query is executed at operation 210. At operation 212, the database management system 102 determines if the first tier query was a success. A query is a success, for example, when it returns at least one record that has a relevance score greater than a threshold value. The database management system 102 may generate the relevance score in any suitable manner. In some examples, the database management system 102 executes or otherwise uses an Apache SOLR platform that generates relevance scores. The database management system 102 may determine that a query is successful if Apache SOLR generates a relevance score for the resulting records (or for at least one resulting record) that is greater than a threshold value. In some examples, additional relevance score measures are used instead of or in conjunction with Apache SOLR relevance scores. Details of an example approach for generating relevance scores for records is provided below.

If the first tier query is successful at operation 212 the database management system 102 returns one or more records returned by the first tier query as a response 116A, 116B to the requesting client application 108A, 108B at operation 216. If the first tier query is unsuccessful, the database management system 102 executes a next tier query at operation 214. The next tier query may be less restrictive than the previous tier query and/or may modify the previous-tier query and/or may boost or deemphasize certain keywords and or sets of column keywords. Additional examples describing the generation of next tier queries are described herein with reference to FIG. 5. If the next tier query is successful, then results of the next tier query are returned as a response 116A, 116B, at operation 216. If the next tier query is not successful, then the database management system 102 executes another next tier query at operation 214. The generated query may be less restrictive than the previous tier query.

In some examples, the restrictiveness of a query is described by whether the query uses a particular keyword or Boolean combination of keywords in a "should" clause or a "must" clause. When a keyword or Boolean combination of keywords is used in a "must" clause, then the query will only return records that include the keyword or Boolean combination of keywords. Consider an example set of column keywords: "Acme" and "Fishing." A query that includes "Acme" and "Fishing" in a must clause will return only records that include "Acme" and "Fishing" in the relevant column.

When a keyword or Boolean combination of keywords is used in a"should" clause, the query can return records that do not include the Boolean combination of keywords, but records without the Boolean combination of keywords receive lower relevance scores. Consider again the example above. A query that includes "Acme" and "Fishing" in a should clause may return a record that do not include either "Acme" or "Fishing," for example, if the other fields of the record cause it to have a suitably high relevance score. A query having a Boolean combination of keywords in a must clause is more restrictive than a query having the same Boolean combination of keywords in a should clause.

Other differences in the restrictiveness of queries are based on the Boolean combination of keywords used for a column or columns. For example, a conjunctive Boolean combination is met when all of the indicated keywords are present. For example, a conjunctive combination of "Acme" and "Fishing" is met only by record fields that include both the keywords "Acme" and the keyword "Fishing." A disjunctive Boolean combination, on the other hand, is met when at least one of the indicated keywords is present. For example, a disjunctive combination of "Acme" and "Fishing" is met by record fields that contain "Acme," by record fields that include "Fishing," and by record fields that include "Acme" and "Fishing." A disjunctive combination of keywords is less restrictive than a conjunctive combination of the same keywords.

Figure 3:
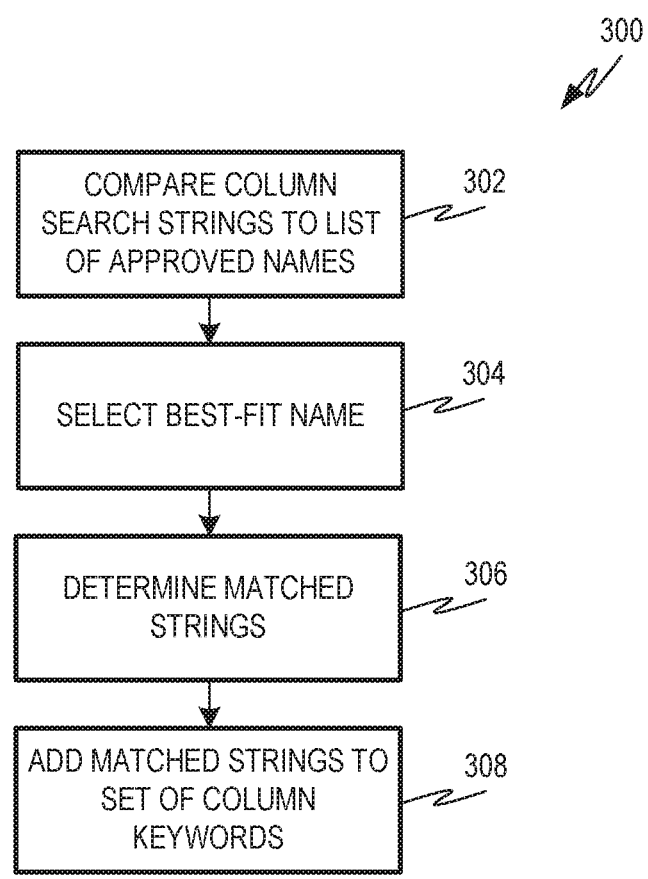
FIG. 3 is a flowchart showing one example of a process flow that can be executed by the database management system to select a set of column keywords using a set of search strings associated with the column.

FIG. 3 is a flowchart showing one example of a process flow 300 that can be executed by the database management system 102 (e.g., the query generator 118 thereof) to select a set of column keywords using a set of search strings associated with the column. As described herein, a search request 114A, 114B may include sets of search strings associated with different columns of a database table. The process flow 300 describes taking the search strings for a single column and generating a corresponding set of column keywords. In some examples, the process flow 300 is executed multiple times (e.g., once for each column).

At operation 302, the database management system 102 compares column search strings to a list of approved names 106. The list of approved names 106 is a list of record field values that have been manually and/or automatically approved. A record field value that is manually approved is indicated by a user (e.g., the user 112) to be the correct name of a record field value. A record field value that is automatically approved is based, for example, on historical correlation between field values and search strings. For example, records that have been previously approved (e.g., automatically or manually) may be automatically approved.

At operation 304, the database management system 102 selects a best-fit name from the list of approved names 106. The best-fit name is the record field value from the list of approved names that is closest to the set of search strings for the considered column. The best-fit name can be selected in any suitable manner. In some examples, a model is generated relating search strings provided with historical search requests to the corresponding record field value of the record field or fields returned in the response, which may be approved names on the list of approved names 106. Any suitable model can be used such as, for example, classification model a fuzzy matching algorithm, a neural network, etc.

Consider an example classification model using a bag of words neural network approach. The neural network may include an input layer, a hidden layer, and an output layer. A training file including the list of approved names may be provided to the neural network. Input features can include values for various record fields such as, for example, raw supplier name, street address, city, postal code, state, country, etc. An output of the neural network is a record identifier, where a unique identifier describes each record in the relevant table.

At operation 306, the database management system 102 identifies matching strings between the set of search strings and the best-fit name. In some examples, the database management system 102 infers one or more matching strings. For example, if a search string is an acronym, the database management system 102 may infer keywords corresponding to the characters of the acronym. For example, the search string "nfl" may have a best-fit name of National Football League. In this example, the terms National, Football, and League are inferred and considered to be matching strings. Also, for example, the database management system 102 can identify matching strings by considering trade styles or other synonyms. The matching strings are added to the set of column keywords for the considered column at operation 308.

Consider an example based on a search request that includes the following search strings for a column: american express travel related services. In this example, the best-fit name from the list of approved names 106 may be American Express. Accordingly, the strings American and Express are added to a set of column keywords for the column. Consider another example based on a search request that includes the following column search strings MES Solutions. In this example, the best-fit name from the list of approved names 106 is MEDICAL EVALUATION SPECIALISTS with an associated string MES. The associated string, in this example, is a trade style or trade name. In this case, the matching strings are MEDICAL, EVALUATION, SPECIALISTS, and MES.

Figure 4:
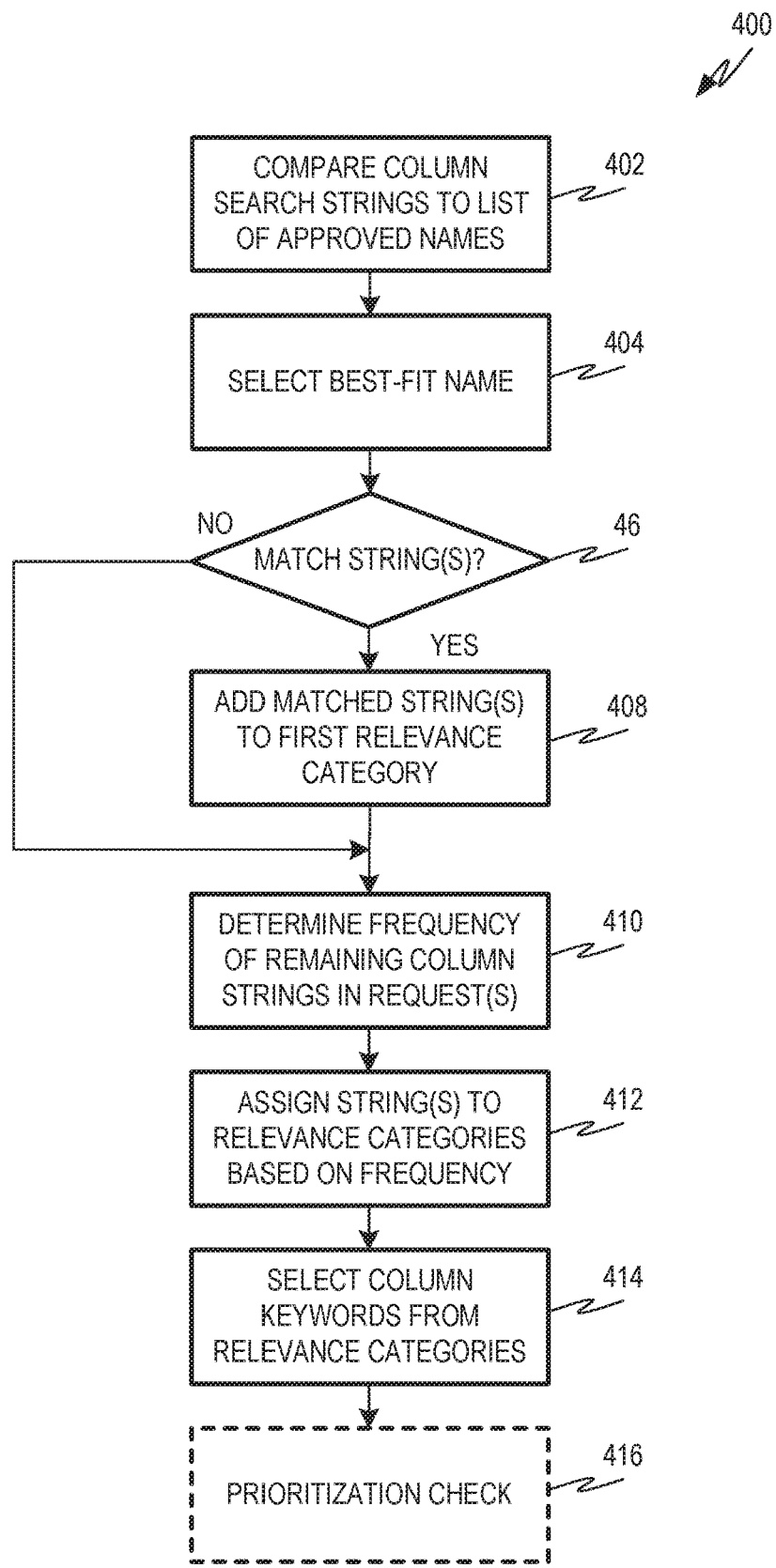
FIG. 4 is a flowchart showing another example of a process flow that can be executed by the database management system to select a set of column keywords using a set of search strings associated with the column.

FIG. 4 is a flowchart showing another example of a process flow 400 that can be executed by the database management system 102 (e.g., the query generator 118 thereof) to select a set of column keywords using a set of search strings associated with the column. As described herein, a search request 114A, 114B may include sets of search strings associated with different columns of a database table. The process flow 400 describes taking the search strings for a single column and generating a corresponding set of column keywords. In some examples, the process flow 400 is executed multiple times (e.g., once for each column). The process flow 400 assigns search strings from the search request to relevance categories and then selects the set of column keywords from the categorized search strings.

At operation 402, the database management system 102 compares column search strings to the list of approved names 106. The list of approved names 106 is a list of record field values that have been manually and/or automatically approved, as described herein. At operation 404, the database management system 102 selects the best-fit name for the set of search strings for the column, for example, as described herein. At operation 406, the database management system 102 determines if there are any matching strings between the best-fit name and the set of search strings for the column. If there are matching strings, the database management system 102 adds the matching strings to a first relevance category at operation 408. The first relevance category may be the relevance category indicating the highest level of relevance.

After adding the matching strings to the first relevance category at operation 408 and/or if there are no matching strings at operation 406, the database management system 102 determines the frequency of any remaining search strings at operation 410. The frequency of a search string indicates how often the search string appears in a record field at the considered column. For example, the more frequent a search string is, the less likely it is to be relevant. At operation 412, the database management system 102 assigns the remaining search strings to relevance categories based on frequency. Any suitable number of frequency-based relevance categories can be used. In some examples, three additional relevance categories are used for a total of four.

At operation 414, a set of column keywords are selected from the categorized search strings. For example, all search strings from the first relevance category are added to the set of column keywords. If this results in less than a threshold number of keywords in the set of column keywords, additional search strings are added from the next relevance category (e.g., the relevance category including search strings with the lowest frequency). If this still results in less than the threshold number of keywords, additional search strings are selected from the next most relevant category, and so on until the threshold number of keywords are included in the set of column keywords.

At optional operation 416, the database management system 102 performs a prioritization check for the keywords selected at operation 414. The prioritization check may be based on the search strings entered by the user 112 and/or client application 108A, 108B. For example, when the search strings are entered, the user 112 and/or client application 108A, 108B may be prompted to identify the search string or strings that the user and/or client application 108A, 108B considers to be most important. The prioritization check may involve comparing the set of column keywords to the search strings indicated to be significant by the user 112 and/or client application 108A, 108B. If the set of column keywords omits significant search strings, the database management system 102 may add those search strings to the set of column keywords.

Figure 5:
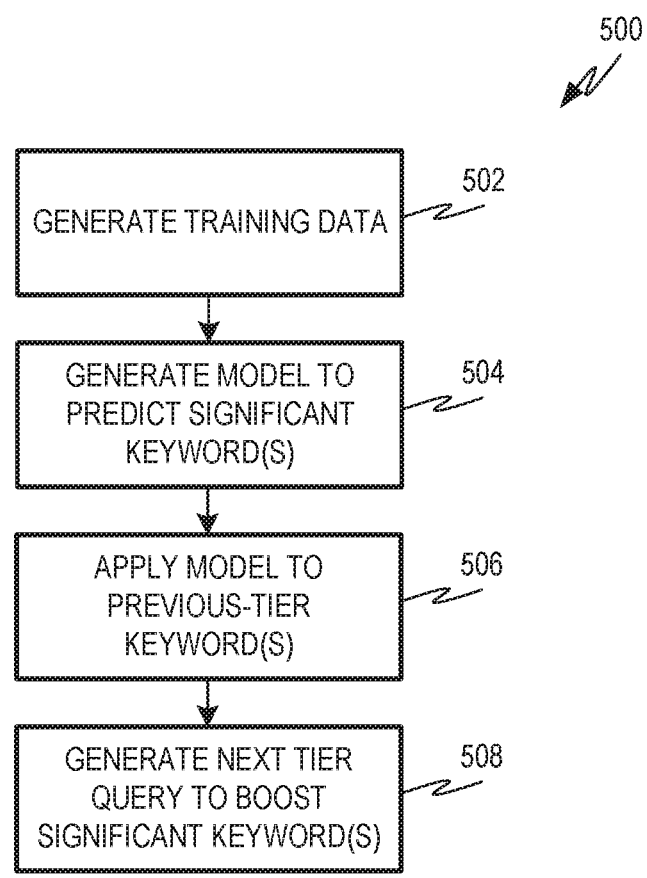
FIG. 5 is a flowchart showing one example of a process flow that may be executed by the database management system to generate a next tier query.

FIG. 5 is a flowchart showing one example of a process flow 500 that may be executed by the database management system 102 (e.g., the query generator 118 thereof) to generate a next tier query. In this way, the process flow 500 is one example way that the database management system 102 can generate a next tier query to be executed at operation 214 of the process flow 200. At operation 502, the database management system 102 generates training data. The training data is generated from previously-executed search requests 114A, 114B and responses 116A, 116B.

At operation 504, the database management system 102 generates a model to predict one or more significant keywords. Significant keywords are keywords that were provided as search strings in previous search requests 114A, 114B, and also were present in the record field of records returned in a corresponding response 116A, 116B. Any suitable model can be used such as, for example, a fuzzy matching algorithm, a neural network, etc. In some examples, the model for predicting significant keywords is generated by tracking historic searches made by users, for example, across the same tenant to the database or users across different tenants.

At operation 506, the database management system 102 applies the model to one or more sets of column keywords from a previous-tier query to identify significant keywords or sets of keywords. At operation 508, the database management system 102 generates the next tier query in a way that boosts the significant keywords determined at operation 506.

A keyword or set of keywords is boosted by increasing the significance of the boosted keyword in the next-tier query relative to the previous-tier query. This can include, for example, moving the keyword or set of keywords from a should clause to a must clause. Boosting a keyword or set of keywords may also include moving a significant keyword from a disjunctive set of keywords. For example, the significant keyword may be considered as part of a disjunctive combination of keywords in the previous-tier query. Boosting the significant keyword can include making the disjunctive combination into a conjunctive combination. In another example, a set of column keywords can be boosted by removing another set of column keywords from consideration.

Consider an example query shown in CHART 1 below:

CHART 1

| Column Name | Keyword Set |
| --- | --- |
| Entity Name | Hancock Roofing & Construction LLC |
| Street Address | PO Box 102753 |
| City | Atlanta |
| State | GA |
| Postal Code | 30368 |
| Country | US |

In this example, the keywords in bold above are determined to be significant by the model. These keywords may be boosted. For example, the database management system 102 may utilize the significant keywords in a must clause of the next-tier query. In another example, the database management system 102 may utilize the significant keywords in conjunctive combinations with other keywords. In another example, the database management system 102 may generate the next-tier query to exclude the non-significant keywords and/or sets of column keywords.

Figure 6:
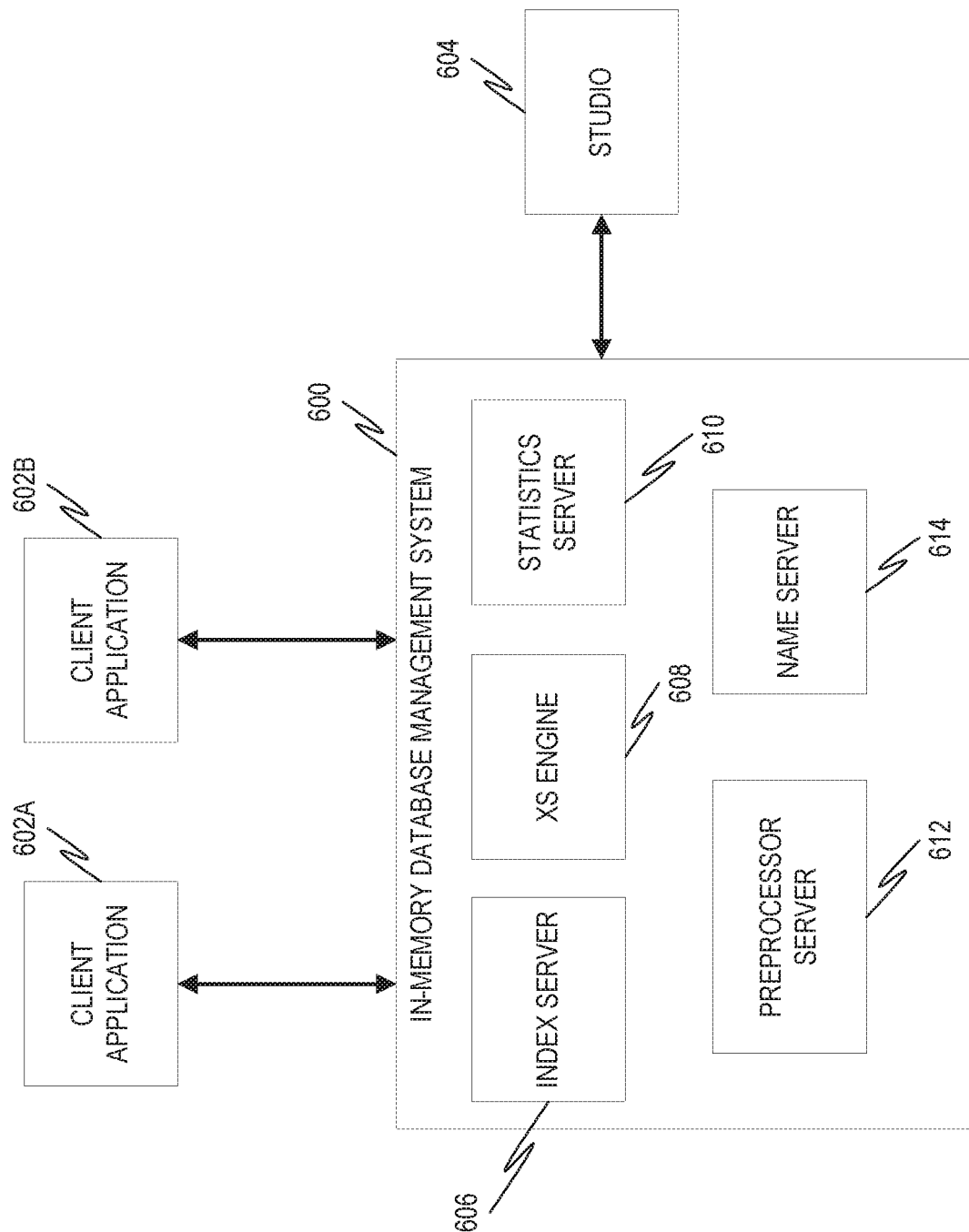
FIG. 6 is a diagram illustrating an example of in-memory database management system that may be used to implement table privilege management, for example, as described herein.

FIG. 6 is a diagram illustrating an example of an in-memory database management system 600 that may be used to implement database record searching as described herein. An in-memory database stores data primarily at main memory, such as a random access memory (RAM). This is different than databases that primarily employ a disk storage mechanism. In some examples, the database management system 600 may be or include an example of the HANA system from SAP AG of Walldorf, Germany. Although various features of table database record searching are described herein in the context of an in-memory database, database record searching as described herein may be generally performed at any suitable database management system.

The in-memory database management system 600 may be coupled to one or more client applications 602A, 602B. Client applications 602A, 602B may perform operations similar to those of the client applications 108A, 108B of FIG. 1. For example, the client applications 602A, 602B may perform one or more functions utilizing data from the database (e.g., database 104) including, for example, presenting a user interface (UI) to one or more users, etc. The client applications 602A, 602B may communicate with the in-memory database management system 600 through a number of different protocols, including Structured Query Language (SQL), Multidimensional Expressions (MDX), Hypertext Transfer Protocol (HTTP), Representational State Transfer (REST), Hypertext Markup Language (HTML).

FIG. 6 also shows a studio 604 that may be used to perform modeling by accessing the in-memory database management system 600. In some examples, the studio 604 may allow complex analysis to be performed on data drawn not only from real time event data and windows, but also from stored database information.

The in-memory database management system 600 may comprise a number of different components, including an index server 606, an XS engine 608, a statistics server 610, a preprocessor server 612, and a name server 614. These components may operate on a single computing device, or may be spread among multiple computing devices (e.g., separate servers). The index server 606 contains the actual data and the engines for processing the data. It may also coordinate and uses the other servers.

The XS engine 608 allows clients to connect to the in-memory database management system 600 using web protocols, such as Hypertext Transfer Protocol (HTTP). Although the XS engine 608 is illustrated as a component of the in-memory database management system 600, in some examples, the XS engine may be implemented as one or more Application Program Interfaces (APIs) and/or services positioned between the client applications 602A, 602B and the in-memory database management system 600. In some examples, the XS engine 608 is configured to process client requests received in languages other than SQL such as, for example, Multidimensional Expressions (MDX), Hypertext Transfer Protocol (HTTP), Representational State Transfer (REST), Hypertext Markup Language (HTML), etc.

The statistics server 610 collects information about status, performance, and resource consumption from all the other server components. The statistics server 610 can be accessed from the studio 604 to obtain the status of various alert monitors.

The preprocessor server 612 is used for analyzing text data and extracting the information on which the text search capabilities are based.

The name server 614 holds information about the database topology. This is used in a distributed system with instances of the database on different hosts. The name server 614 knows where the components are running and which data is located on which server. In an example embodiment, a separate enqueue server may operate in the manner described above with respect to enqueue servers, specifically with regard to creating and managing lightweight enqueue sessions.

Figure 7:
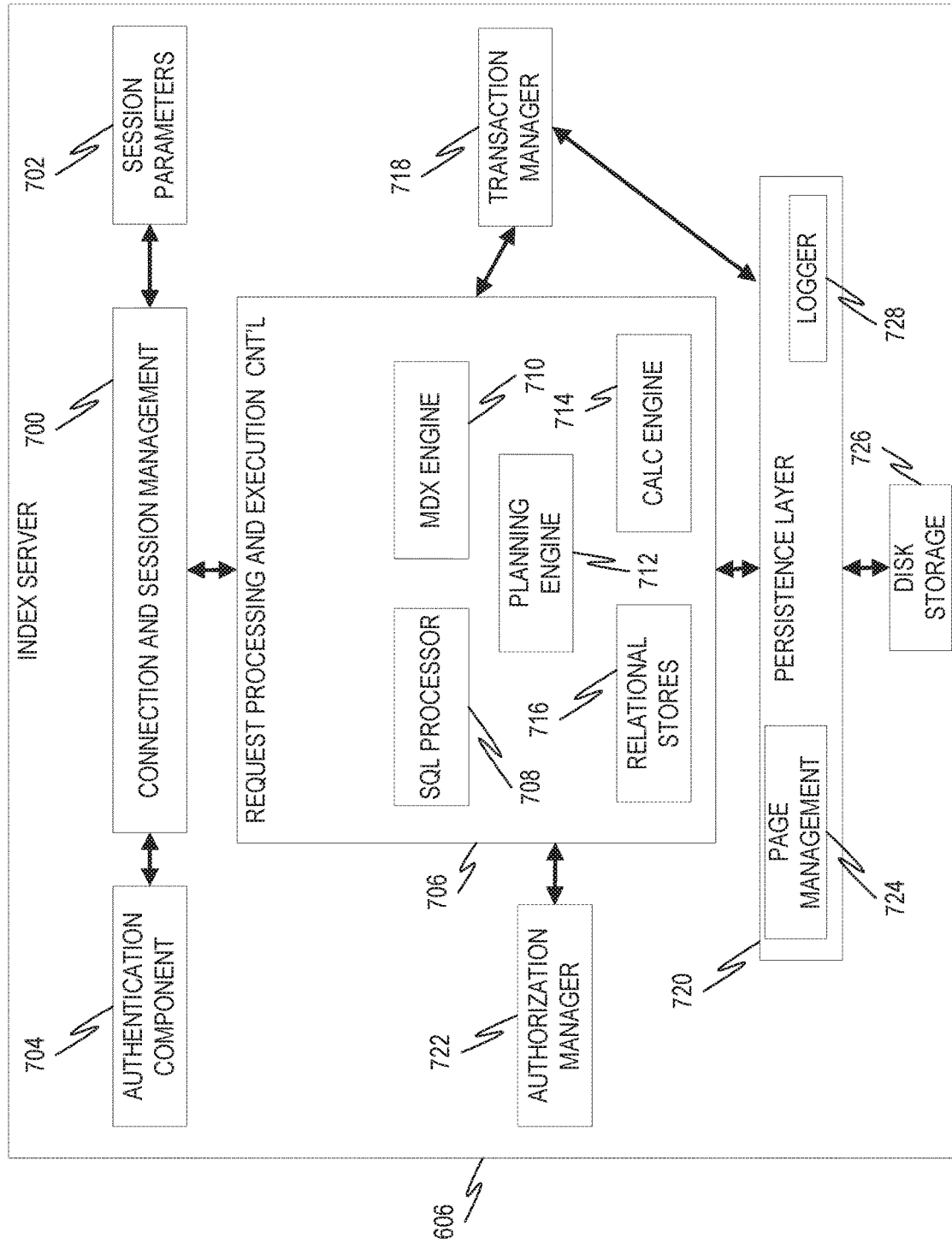
FIG. 7 is a diagram illustrating an example of an index server of the in-memory database management system of FIG. 6.

FIG. 7 is a diagram illustrating an example of the index server 606. Specifically, the index server 606 of FIG. 6 is depicted in more detail. The index server 606 includes a connection and session management component 700, which is responsible for creating and managing sessions and connections for the database clients (e.g. client applications 602A, 602B). Once a session is established, clients can communicate with the database system using SQL statements. For each session, a set of session parameters 702 may be maintained, such as auto-commit, current transaction isolation level, etc. Users (e.g., system administrators, developers) may be authenticated by the database system itself (e.g., by logging in with log-in information such as a user name and password, using an authentication component 704) or authentication can be delegated to an external authentication provider such as a Lightweight Directory Access Protocol (LDAP) directory.

Client requests can be analyzed and executed by a set of components summarized as request processing and execution control 706. For example, the execution control 706 may implement database searching as described herein. An SQL processor 708 checks the syntax and semantics of the client SQL statements and generates a logical execution plan. Multidimensional expressions (MDX) is a language for querying and manipulating multidimensional data stored in OLAP cubes. As such, an MDX engine 710 may be provided to allow for the parsing and executing of MDX commands. A planning engine 712 allows applications to execute basic planning operations in the database layer. One such operation is to create a new version of a dataset as a copy of an existing dataset, while applying filters and transformations.

A calculation engine 714 implements the various SQL script and planning operations. The calculation engine 714 creates a logical execution plan for calculation models derived from SQL script, MDX, planning, and domain-specific models. This logical execution plan may include, for example, breaking up a model into operations that can be processed in parallel. The data is stored in relational stores 716, which implement a relational database in main memory. Each SQL statement may be processed in the context of a transaction. New sessions are implicitly assigned to a new transaction. A transaction manager 718 coordinates database transactions, controls transactional isolation, and keeps track of running and closed transactions. When a transaction is committed or rolled back, the transaction manager 718 informs the involved engines about this event so they can execute needed actions. The transaction manager 718 also cooperates with a persistence layer 720 to achieve atomic and durable transactions.

An authorization manager 722 is invoked by other database system components to check whether the user has the specified privileges to execute the requested operations. The database system allows for the granting of privileges to users or roles. A privilege grants the right to perform a specified operation on a specified object.

The persistence layer 720 ensures that the database is restored to the most recent committed state after a restart and that transactions are either completely executed or completely undone. To achieve this goal in an efficient way, the persistence layer 720 uses a combination of write-ahead logs, shadow paging, and save points. The persistence layer 720 also offers a page management interface 724 for writing and reading data to a separate disk storage 726, and also contains a logger 728 that manages the transaction log. Log entries can be written implicitly by the persistence layer 720 when data is written via the persistence interface or explicitly by using a log interface.

Figure 8:
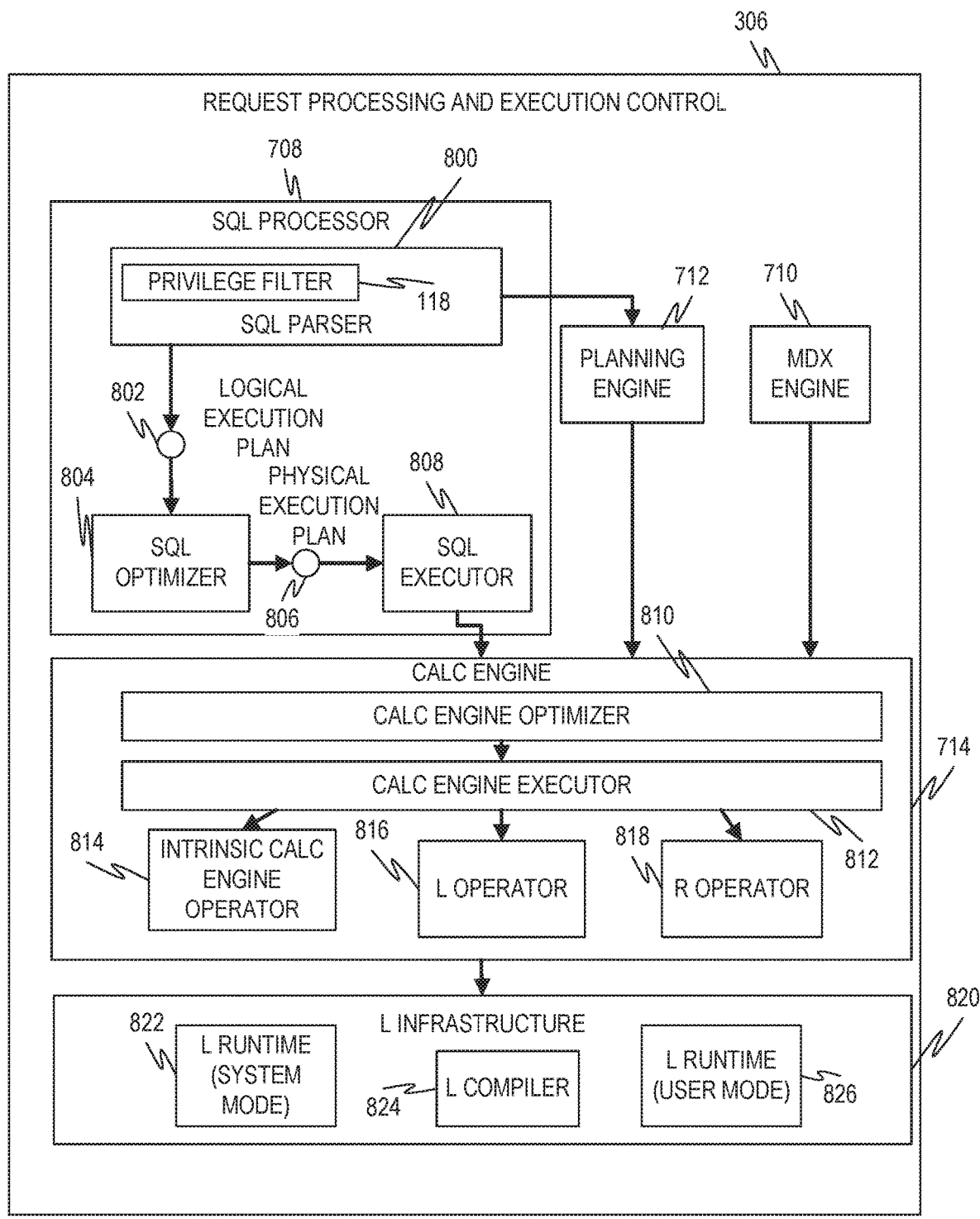
FIG. 8 is a diagram illustrating one example of the request processing and execution control of the database management system of FIG. 6.

FIG. 8 is a diagram illustrating one example of the request processing and execution control 706. This diagram depicts the request processing and execution control 706 of FIG. 7 in more detail. The SQL processor 708 contains an SQL parser 800, which parses the SQL statement and generates a logical execution plan 802, which it passes to an SQL optimizer 804. The SQL optimizer 804 optimizes the logical execution plan 802 and converts it to a physical execution plan 806, which it then passes to a SQL executor 808. The calculation engine 714 implements the various SQL script and planning operations, and includes a calc engine optimizer 810, which optimizes the operations, and a calc engine executor 812, which executes the operations, as well as an intrinsic calc engine operator 814, an L operator 816, and an R operator 818.

An L infrastructure 820 includes a number of components to aid in the running of L procedures, including an L-runtime (system mode) 822, an L compiler 824, and an L-runtime (User mode) 826.

As described herein, the database management system can use an Apache SOLR platform or other similar platform to generate a relevance score for records (e.g., records returned by a query). The relevance score describes a nearness of a record to a query based, for example, on fields of the record. In examples for which the record indicates a business entity, such as a supplier, the relevance score may be based on the nearness of fields such as supplier name, street address, city, postal code, state, country, etc.

In some examples, different fields of a record can be the subject of different scoring algorithms. Accordingly, each field can be assigned a field score. Multiple field scores can be aggregated into an overall relevance score for the record. Various suitable approaches can be used to assign field scores to different fields of a record. For example, fields including multiple strings, such as entity name fields, can be scored utilizing a rationalized name distance algorithm, as described below. Fields including a single string or limited number of strings, such as, for example, a city name field, a state field, etc., can be assigned a field score utilizing, for example, an NGram distance. Some fields having a single string, such as a country field, can be assigned a binary score indicating a match or lack of match. Some fields having numerical values, such as a postal code field, can receive a field score that is weighted with more weight given to matches (or failed matches) among early numerals.

Consider an example in which the records describe business entities such as suppliers. The database management system can assign a field score to a supplier name field in a returned query, for example, using a rationalized name distance algorithm. For example, each string in the supplier name can be tagged, for example, with a tag indicating the significance of the string such as, for example, significant, regular, frequent, or noise.

The field score for the field can be based on a comparison of the record strings to the strings of the query. Each match or failure to match between strings of the record field and corresponding strings of the query can be given a match score. Different matches or failures to match can have a different match scores, for example, based on the significance of the strings. For example, a match or failure to match between significant words may be assigned a higher positive or negative match score than a match or failure to match between frequent or noise words. The position of strings in a field or query can also be considered. For example, a match or failure to match of the first string in a record with the first string in the query may be assigned a higher positive or negative match score than a match or failure to match of subsequent words. The field score for the field can be found, for example, by taking a weighted average of the match scores for the various strings. In some examples, other After computing the field scores for a record, the field scores can be normalized. This can include taking each field score one at a time in order of significance and finding an incremental score. The incremental score can be based on the incremental score generated from the previously-considered field. An example formula for generating incremental scores is given by [1] below:

$$\text{incrementalScore} = ((\text{incrementalScore} * (1f - \text{fieldWeight})) + (\text{fieldWeight} * \text{fieldScore})) \quad [1]$$

In some examples, exact matches at a field increase the weight of the field. For example, a street address field may be given a weight of X % ordinarily but if there is an exact match of the street address, the weight may be increased to Y % where Y is greater than X. The final incremental score (e.g., considering all of the field scores) may be the relevance score for the record.

In some examples, techniques for generating the relevance score may be different for different implementations. For example, if a particular database has corrupted values in a column, the field scores corresponding to that column may be omitted or otherwise not considered in generating the relevance score. Also, in some examples, relevance scoring can be conducted in multiple passes. After each pass, returned records having a relevance score less than a threshold may be removed from further consideration. In some examples, different passes generate relevance scores in different ways. For example, a first pass may consider all fields of a record and may use a first set of weights. A second pass may consider less than all fields of a record and use a different set of weights. When a match above the threshold is found, the results may be sorted according to the current weight and returned to the user.

EXAMPLES

Example 1 is a database management system for identifying database records in a database table, the database management system comprising: a hardware processor; and a machine-readable medium comprising instructions thereon that, when executed by the hardware processor, cause the hardware processor to perform operations comprising: receiving a search request comprising a first set of strings associated with a first column of the database table and a second set of strings associated with a second column of the database table; selecting a set of first column keywords using the first set of strings; executing a first tier query at the database table, the first tier query comprising, a must clause based at least in part on the set of first column keywords, and a should clause based at least in part on a set of second column keywords; responsive to determining that no database record returned by the first tier query has a relevance score greater than a threshold value, executing a second tier query at the database table, the second tier query comprising a first should clause based at least in part on the set of first column keywords and a second should clause based at least in part on the set of second column keywords; and selecting at least one database record for a response to the search request, the selecting based at least in part on the second tier query.

In Example 2, the subject matter of Example 1 optionally includes the operations further comprising: responsive to determining that no database record returned by the second tier query has a relevance score greater than the threshold value, executing a third tier query at the database table, the third tier query comprising at least one disjunctive combination of a first keyword of the set of second column keywords and a second keyword of the set of second column keywords.

In Example 3, the subject matter of any one or more of Examples 1-2 optionally includes wherein selecting the set of first column keywords comprises: identifying a best-fit name from an approved list of names using the first set of strings; determining that a first string of the first set of strings matches a second string of the best-fit name; and adding the first string to the set of first column keywords.

In Example 4, the subject matter of Example 3 optionally includes the operations further comprising: receiving, from a user, an indication that a second string of the first set of strings corresponds to a name associated with the first column of the database table; and adding the name to the approved list of names.

In Example 5, the subject matter of any one or more of Examples 3-4 optionally includes the operations further comprising: assigning the first string to a first relevance category; and assigning a second string of the first set of strings to a second relevance category based at least in part on a frequency of the second string in search requests to the database table.

In Example 6, the subject matter of Example 5 optionally includes the operations further comprising: adding all strings assigned to the first relevance category to the set of first column keywords; determining that the set of first column keywords includes less than a threshold number of keywords; and adding at least one string assigned to the second relevance category to the set of first column keywords.

In Example 7, the subject matter of any one or more of Examples 1-6 optionally includes wherein the search request further comprises a third set of strings associated with a third column of the database table, the database management system the operations further comprising: determining that a relevance score of the third set of strings is less than a threshold value; and executing the second tier query without consideration of the third column.

In Example 8, the subject matter of any one or more of Examples 1-7 optionally includes the operations further comprising stemming at least one of the first set of strings to generate a stemmed first set of strings, wherein the set of first column keywords is selected from the stemmed first set of strings.

Example 9 is a method of identifying database records in a database table, the method comprising: receiving a search request comprising a first set of strings associated with a first column of the database table and a second set of strings associated with a second column of the database table; selecting a set of first column keywords using the first set of strings; executing a first tier query at the database table, the first tier query comprising, a must clause based at least in part on the set of first column keywords, and a should clause based at least in part on a set of second column keywords; responsive to determining that no database record returned by the first tier query has a relevance score greater than a threshold value, executing a second tier query at the database table, the second tier query comprising a first should clause based at least in part on the set of first column keywords and a second should clause based at least in part on the set of second column keywords; and selecting at least one database record for a response to the search request, the selecting based at least in part on the second tier query.

In Example 10, the subject matter of Example 9 optionally includes responsive to determining that no database record returned by the second tier query has a relevance score greater than the threshold value, executing a third tier query at the database table, the third tier query comprising at least one disjunctive combination of a first keyword of the set of second column keywords and a second keyword of the set of second column keywords.

In Example 11, the subject matter of any one or more of Examples 9-10 optionally includes wherein selecting the set of first column keywords comprises: identifying a best-fit name from an approved list of names using the first set of strings; determining that a first string of the first set of strings matches a second string of the best-fit name; and adding the first string to the set of first column keywords.

In Example 12, the subject matter of Example 11 optionally includes receiving, from a user, an indication that a second string of the first set of strings corresponds to a name associated with the first column of the database table; and adding the name to the approved list of names.

In Example 13, the subject matter of any one or more of Examples 11-12 optionally includes assigning the first string to a first relevance category; and assigning a second string of the first set of strings to a second relevance category based at least in part on a frequency of the second string in search requests to the database table.

In Example 14, the subject matter of Example 13 optionally includes adding all strings assigned to the first relevance category to the set of first column keywords; determining that the set of first column keywords includes less than a threshold number of keywords; and adding at least one string assigned to the second relevance category to the set of first column keywords.

In Example 15, the subject matter of any one or more of Examples 9-14 optionally includes wherein the search request further comprises a third set of strings associated with a third column of the database table, further comprising: determining that a relevance score of the third set of strings is less than a threshold value; and executing the second tier query without consideration of the third column.

In Example 16, the subject matter of any one or more of Examples 9-15 optionally includes stemming at least one of the first set of strings to generate a stemmed first set of strings, wherein the set of first column keywords is selected from the stemmed first set of strings.

Example 17 is a machine-readable medium comprising instructions thereon that, when executed by a hardware processor, cause the hardware processor to perform operations comprising: receiving a search request comprising a first set of strings associated with a first column of a database table and a second set of strings associated with a second column of the database table; selecting a set of first column keywords using the first set of strings; executing a first tier query at the database table, the first tier query comprising, a must clause based at least in part on the set of first column keywords, and a should clause based at least in part on a set of second column keywords; responsive to determining that no database record returned by the first tier query has a relevance score greater than a threshold value, executing a second tier query at the database table, the second tier query comprising a first should clause based at least in part on the set of first column keywords and a second should clause based at least in part on the set of second column keywords; and selecting at least one database record for a response to the search request, the selecting based at least in part on the second tier query.

In Example 18, the subject matter of Example 17 optionally includes the operations further comprising: responsive to determining that no database record returned by the second tier query has a relevance score greater than the threshold value, executing a third tier query at the database table, the third tier query comprising at least one disjunctive combination of a first keyword of the set of second column keywords and a second keyword of the set of second column keywords.

In Example 19, the subject matter of any one or more of Examples 17-18 optionally includes wherein selecting the set of first column keywords comprises: identifying a best-fit name from an approved list of names using the first set of strings; determining that a first string of the first set of strings matches a second string of the best-fit name; and adding the first string to the set of first column keywords.

In Example 20, the subject matter of Example 19 optionally includes the operations further comprising: receiving, from a user, an indication that a second string of the first set of strings corresponds to a name associated with the first column of the database table; and adding the name to the approved list of names.

Figure 9:
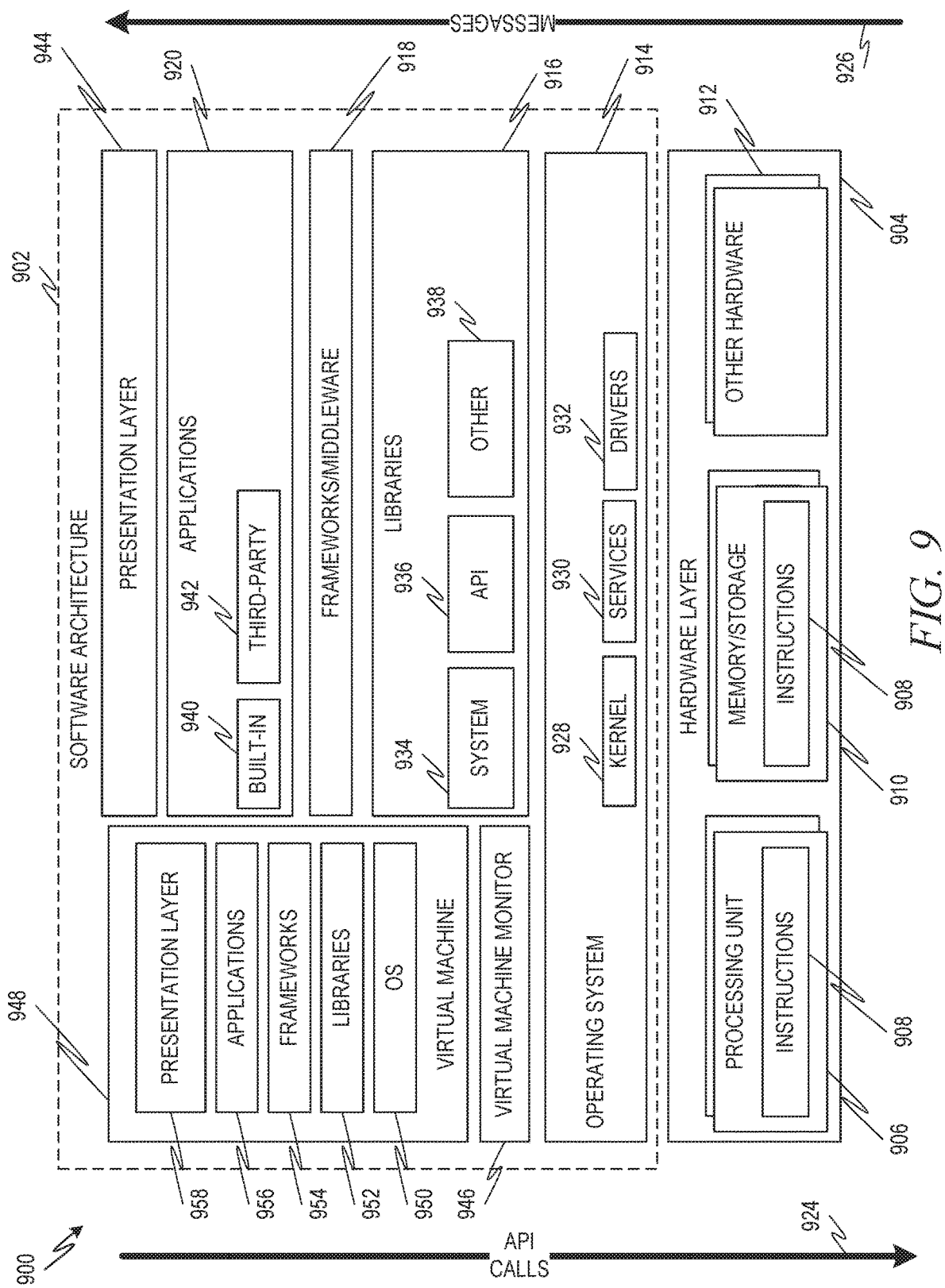
FIG. 9 is a block diagram showing one example of a software architecture for a computing device.

FIG. 9 is a block diagram 900 showing one example of a software architecture 902 for a computing device. The architecture 902 may be used in conjunction with various hardware architectures, for example, as described herein. FIG. 9 is merely a non-limiting example of a software architecture and many other architectures may be implemented to facilitate the functionality described herein. A representative hardware layer 904 is illustrated and can represent, for example, any of the above referenced computing devices. In some examples, the hardware layer 904 may be implemented according to the architecture of the computer system 1000 of FIG. 10.

The representative hardware layer 904 comprises one or more processing units 906 having associated executable instructions 908. Executable instructions 908 represent the executable instructions of the software architecture 902, including implementation of the methods, modules, subsystems, and components, and so forth described herein and may also include memory and/or storage modules 910, which also have executable instructions 908. Hardware layer 904 may also comprise other hardware as indicated by other hardware 912 which represents any other hardware of the hardware layer 904, such as the other hardware illustrated as part of computer system 1000.

In the example architecture of FIG. 9, the software architecture 902 may be conceptualized as a stack of layers where each layer provides particular functionality. For example, the software architecture 902 may include layers such as an operating system 914, libraries 916, frameworks/middleware 918, applications 920 and presentation layer 944. Operationally, the applications 920 and/or other components within the layers may invoke application programming interface (API) calls 924 through the software stack and access a response, returned values, and so forth illustrated as messages 926 in response to the API calls 924. The layers illustrated are representative in nature and not all software architectures have all layers. For example, some mobile or special purpose operating systems may not provide a frameworks/middleware layer 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. In some examples, the services 930 include an interrupt service. The interrupt service may detect the receipt of an interrupt and, in response, cause the architecture 902 to pause its current processing and execute an interrupt service routine (ISR) when an interrupt is accessed.

The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than to interface directly with the underlying operating system 914 functionality (e.g., kernel 928, services 930 and/or drivers 932). The libraries 916 may include system 934 libraries (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 10D in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks 918 (also sometimes referred to as middleware) may provide a higher-level common infrastructure that may be utilized by the applications 920 and/or other software components/modules. For example, the frameworks 918 may provide various graphic user interface (GUI) functions, high-level resource management, high-level location services, and so forth. The frameworks 918 may provide a broad spectrum of other APIs that may be utilized by the applications 920 and/or other software components/modules, some of which may be specific to a particular operating system or platform.

The applications 920 includes built-in applications 940 and/or third party applications 942. Examples of representative built-in applications 940 may include, but are not limited to, a contacts application, a browser application, a book reader application, a location application, a media application, a messaging application, and/or a game application. Third party applications 942 may include any of the built in applications as well as a broad assortment of other applications. In a specific example, the third party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third party application 942 may invoke the API calls 924 provided by the mobile operating system such as operating system 914 to facilitate functionality described herein.

The applications 920 may utilize built in operating system functions (e.g., kernel 928, services 930 and/or drivers 932), libraries (e.g., system 934, APIs 936, and other libraries 938), frameworks/middleware 918 to create user interfaces to interact with users of the system. Alternatively, or additionally, in some systems interactions with a user may occur through a presentation layer, such as presentation layer 944. In these systems, the application/module "logic" can be separated from the aspects of the application/module that interact with a user.

Some software architectures utilize virtual machines. In the example of FIG. 9, this is illustrated by virtual machine 948. A virtual machine creates a software environment where applications/modules can execute as if they were executing on a hardware computing device. A virtual machine is hosted by a host operating system (operating system 914) and typically, although not always, has a virtual machine monitor 946, which manages the operation of the virtual machine as well as the interface with the host operating system (i.e., operating system 914). A software architecture executes within the virtual machine such as an operating system 950, libraries 952, frameworks/middleware 954, applications 956 and/or presentation layer 958. These layers of software architecture executing within the virtual machine 948 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus. e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 10:
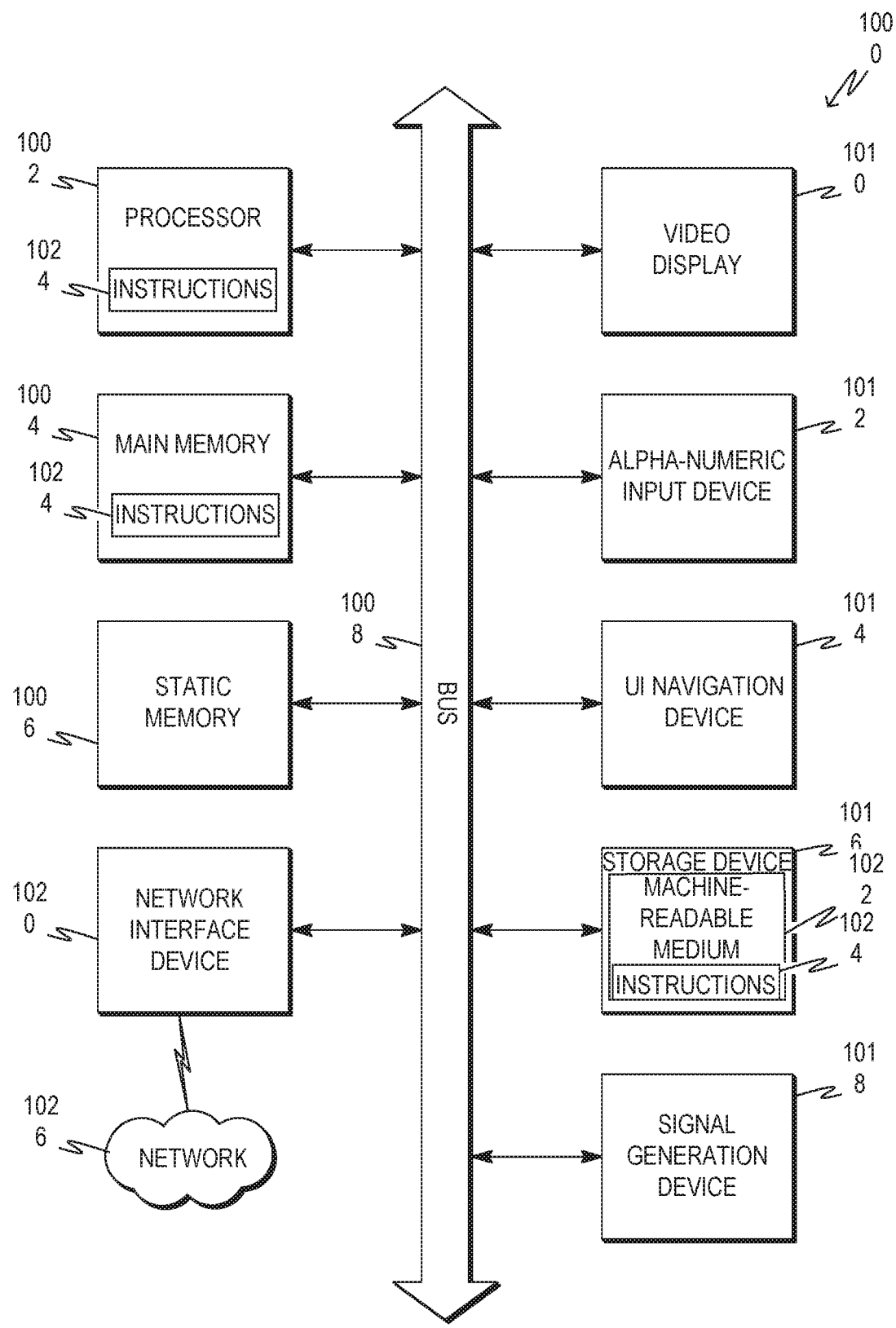
FIG. 10 is a block diagram of a machine in the example form of a computer system within which instructions may be executed for causing the machine to perform any one or more of the methodologies discussed herein.

FIG. 10 is a block diagram of a machine in the example form of a computer system 1000 within which instructions 1024 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI) navigation (or cursor control) device 1014 (e.g., a mouse), a disk drive unit 1016, a signal generation device 1018 (e.g., a speaker), and a network interface device 1020.

Machine-Readable Medium

The disk drive unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, with the main memory 1004 and the processor 1002 also constituting machine-readable media 1022.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding, or carrying instructions 1024 for execution by the machine and that cause the machine to perform any one or more of the methodologies of the present disclosure, or that is capable of storing, encoding, or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1024 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A database management system for identifying database records in a database table, the database management system comprising:

a hardware processor; and a machine-readable medium comprising instructions thereon that, when executed by the hardware processor, cause the hardware processor to perform operations comprising:

receiving a search request comprising a first set of strings associated with a first column of the database table and a second set of strings associated with a second column of the database table;

selecting a set of first column keywords using the first set of strings, the selecting comprising:

assigning a first portion of the first set of strings to a first relevance category;

assigning a second portion of the first set of strings to a second relevance category based at least in part on a frequency of at least one string of the second portion of the first set of strings in search results from the database table;

selecting a set of second column keywords using the second set of strings;

executing a first tier query at the database table, the first tier query comprising, a must clause indicating that database records returned by the first tier query must include at least one of the set of first column keywords at the first column, and a should clause indicating that database records returned by the first tier query should include at least one of the set of second column keywords at the second column;

responsive to determining that no database record returned by the first tier query has a relevance score greater than a threshold value, executing a second tier query at the database table, the second tier query comprising a first should clause indicating that database records returned by the second tier query should include at least one of the set of first column keywords at the first column and a second should clause indicating that database records returned by the second tier query should include at least one of the set of second column keywords at the second column; and selecting at least one database record for a response to the search request, the selecting based at least in part on the second tier query.

2. The database management system of claim 1, the operations further comprising:

responsive to determining that no database record returned by the second tier query has a relevance score greater than the threshold value, executing a third tier query at the database table, the third tier query comprising at least one disjunctive combination of a first keyword of the set of second column keywords and a second keyword of the set of second column keywords.

3. The database management system of claim 1, wherein selecting the set of first column keywords comprises:

identifying a best-fit name from an approved list of names using the first set of strings;

determining that a first string of the first set of strings matches a second string of the best-fit name; and adding the first string to the set of first column keywords.

4. The database management system of claim 3, the operations further comprising:

receiving, from a user, an indication that a second string of the first set of strings corresponds to a name associated with the first column of the database table; and adding the name to the approved list of names.

5. The database management system of claim 1, the operations further comprising:

adding the first portion of the first set of strings to the set of first column keywords;

determining that the set of first column keywords includes less than a threshold number of keywords; and adding at least one string assigned to the second relevance category to the set of first column keywords.

6. The database management system of claim 1, wherein the search request further comprises a third set of strings associated with a third column of the database table, the database management system the operations further comprising:

determining that a relevance score of the third set of strings is less than a threshold value; and executing the second tier query without consideration of the third column.

7. The database management system of claim 1, the operations further comprising stemming at least one of the first set of strings to generate a stemmed first set of strings, wherein the set of first column keywords is selected from the stemmed first set of strings.

8. A method of identifying database records in a database table, the method comprising:

receiving a search request comprising a first set of strings associated with a first column of the database table and a second set of strings associated with a second column of the database table;

selecting a set of first column keywords using the first set of strings, the selecting comprising:

assigning a first portion of the first set of strings to a first relevance category;

assigning a second portion of the first set of strings to a second relevance category based at least in part on a frequency of at least one string of the second portion of the first set of strings in search results from the database table;

selecting a set of second column keywords using the second set of strings;

executing a first tier query at the database table, the first tier query comprising, a must clause indicating that database records returned by the first tier query must include at least one of the set of first column keywords at the first column, and a should clause indicating that database records returned by the first tier query should include at least one of the set of second column keywords at the second column;

responsive to determining that no database record returned by the first tier query has a relevance score greater than a threshold value, executing a second tier query at the database table, the second tier query comprising a first should clause indicating that database records returned by the second tier query should include at least one of the set of first column keywords at the first column, and a second should clause indicating that database records returned by the second tier query should include at least one of the set of second column keywords; and selecting at least one database record for a response to the search request, the selecting based at least in part on the second tier query.

9. The method of claim 8, further comprising:

responsive to determining that no database record returned by the second tier query has a relevance score greater than the threshold value, executing a third tier query at the database table, the third tier query comprising at least one disjunctive combination of a first keyword of the set of second column keywords and a second keyword of the set of second column keywords.

10. The method of claim 8, wherein selecting the set of first column keywords comprises:

identifying a best-fit name from an approved list of names using the first set of strings;

determining that a first string of the first set of strings matches a second string of the best-fit name; and adding the first string to the set of first column keywords.

11. The method of claim 10, further comprising:

receiving, from a user, an indication that a second string of the first set of strings corresponds to a name associated with the first column of the database table; and adding the name to the approved list of names.

12. The method of claim 8, further comprising:

adding the first portion of the first set of strings to the set of first column keywords;

determining that the set of first column keywords includes less than a threshold number of keywords; and adding at least one string assigned to the second relevance category to the set of first column keywords.

13. The method of claim 8, wherein the search request further comprises a third set of strings associated with a third column of the database table, further comprising:

determining that a relevance score of the third set of strings is less than a threshold value; and executing the second tier query without consideration of the third column.

14. The method of claim 8, further comprising stemming at least one of the first set of strings to generate a stemmed first set of strings, wherein the set of first column keywords is selected from the stemmed first set of strings.

15. A non-transitory machine-readable medium comprising instructions thereon that, when executed by a hardware processor, cause the hardware processor to perform operations comprising:

receiving a search request comprising a first set of strings associated with a first column of a database table and a second set of strings associated with a second column of the database table;

selecting a set of first column keywords using the first set of strings, the selecting comprising:
  assigning a first portion of the first set of strings to a first relevance category;
  assigning a second portion of the first set of strings to a second relevance category based at least in part on a frequency of at least one string of the second portion of the first set of strings in search results from the database table;

selecting a set of second column keywords using the second set of strings;

executing a first tier query at the database table, the first tier query comprising, a must clause indicating that database records returned by the first tier query must include at least one of the set of first column keywords at the first column, and a should clause indicating that database records returned by the first tier query should include at least one of the set of second column keywords at the second column;

responsive to determining that no database record returned by the first tier query has a relevance score greater than a threshold value, executing a second tier query at the database table, the second tier query comprising a first should clause indicating that database records returned by the second tier query should include at least one of the set of first column keywords at the first column and a second should clause indicating that database records returned by the second tier query should include at least one of the set of second column keywords at the second column; and selecting at least one database record for a response to the search request, the selecting based at least in part on the second tier query.

16. The machine-readable medium of claim 15, the operations further comprising:
  responsive to determining that no database record returned by the second tier query has a relevance score greater than the threshold value, executing a third tier query at the database table, the third tier query comprising at least one disjunctive combination of a first keyword of the set of second column keywords and a second keyword of the set of second column keywords.

17. The machine-readable medium of claim 15, wherein selecting the set of first column keywords comprises:
  identifying a best-fit name from an approved list of names using the first set of strings;
  determining that a first string of the first set of strings matches a second string of the best-fit name; and
  adding the first string to the set of first column keywords.

18. The machine-readable medium of claim 17, the operations further comprising:
  receiving, from a user, an indication that a second string of the first set of strings corresponds to a name associated with the first column of the database table; and
  adding the name to the approved list of names.

19. The machine-readable medium of claim 15, wherein the search request further comprises a third set of strings associated with a third column of the database table, the operations further comprising:
  determining that a relevance score of the third set of strings is less than a threshold value; and
  executing the second tier query without consideration of the third column.

* * * * *